United States Patent
Morrow

(10) Patent No.: US 6,473,118 B1
(45) Date of Patent: Oct. 29, 2002

(54) IMAGING SYSTEMS

(75) Inventor: James Morrow, Guildford (GB)

(73) Assignee: Barr & Stroud Limited, Glasgow (GB)

(*) Notice: Subject to any disclaimer, the term of this patent is extended or adjusted under 35 U.S.C. 154(b) by 0 days.

(21) Appl. No.: 09/308,558

(22) PCT Filed: Nov. 28, 1997

(86) PCT No.: PCT/GB97/03278

§ 371 (c)(1),
(2), (4) Date: Jul. 15, 1999

(87) PCT Pub. No.: WO98/26597

PCT Pub. Date: Jun. 18, 1998

(30) Foreign Application Priority Data

Dec. 10, 1996 (GB) ............................................. 9625619

(51) Int. Cl.[7] ................................................. H04N 7/18
(52) U.S. Cl. ........................... 348/143; 348/36; 348/37; 348/38; 348/39

(58) Field of Search ........................... 348/143, 36, 37, 348/38, 39; H04N 7/18

(56) References Cited

U.S. PATENT DOCUMENTS

| | | | | |
|---|---|---|---|---|
| 2,058,681 A | * | 10/1936 | Gould | 348/37 |
| 4,613,898 A | * | 9/1986 | Bagnall-Wild et al. | 348/39 |
| 4,707,735 A | * | 11/1987 | Busby | 348/36 |
| 5,051,830 A | * | 9/1991 | Hoessle | 348/144 |
| 5,790,183 A | * | 8/1998 | Kerbyson | 348/37 |

* cited by examiner

Primary Examiner—Howard Britton
(74) Attorney, Agent, or Firm—Alston & Bird LLP

(57) ABSTRACT

An imaging system comprises an image-data collection station (1) having a platform (2) which is rotatable about an azimuthal axis. Several image sensors (3) are mounted on and rotate with the platform (2). A static monitoring station (7) includes a computerized sensor control system (10) for selectably and independently turning the sensors (3) ON and OFF during the rotation of the platform (2). Station (7) additionally monitors the data output from the sensors (3) and delivers a visible output at a VDU (8).

6 Claims, 1 Drawing Sheet

IMAGING SYSTEMS

Figure 1:
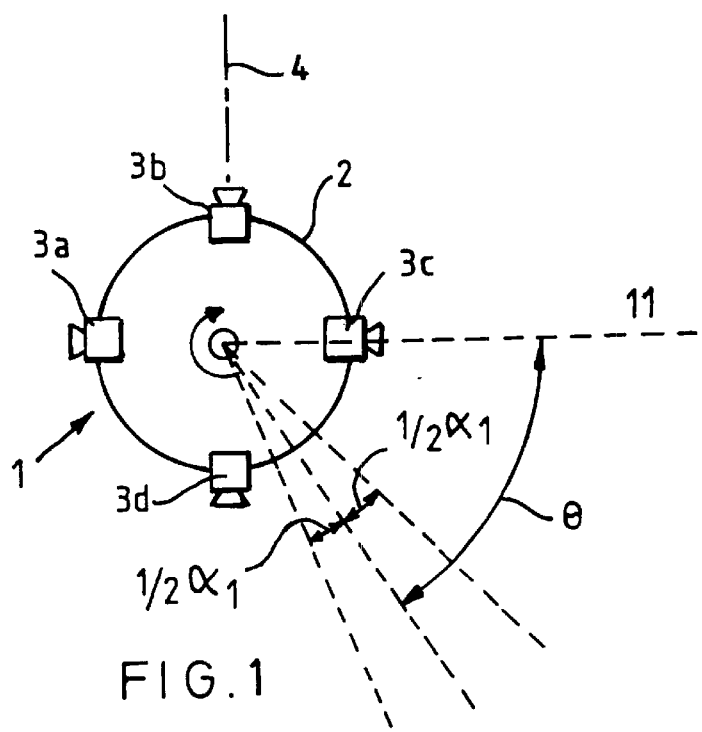

The present invention relates to imaging systems and in particular to imaging systems capable of acquiring image data over a wide-angle field.

For security and other purposes there is often a requirement for a surveillance system which can be used to examine a wide-angle field of view, often up to a full 360° panorama. GB2157526 describes an imaging system having a platform which is rotatable about an azimuthal axis and which carries an image data collection sensor having a fixed field of view. The platform is continuously rotated about the axis to scan the sensor field of view around a 360° panorama at a fixed elevational angle. Normally, data is acquired between two angular positions for display at a display station. There exists a trade-off between the spacing of these two angular positions and the resolution of the data acquired and displayed.

A problem with the system of GB2157526 is the lack of flexibility and the lack of redundancy provided.

It is an object of the present invention to provide an imaging system which overcomes or at least mitigates disadvantages of the above system.

According to a first aspect of the present invention there is provided an imaging system comprising an image-data collection station which is rotatable about an azimuthal axis, the image data collection station comprising at least two circumferentially spaced apart image sensors arranged for rotation with the station and sensor control means for selectably and independently turning the sensors on and off during a rotation of the data collection station.

It will be appreciated that, as the first aspect of the present invention provides a plurality of image sensors, embodiments of the present invention have a degree of built-in redundancy, e.g. if one sensor fails another sensor can still be used to collect image data from an area of interest. In the event that one or a proportion of the image sensors fail, the result will not be a complete loss of image data. Embodiments also provide for increased flexibility. For example, where the bandwith (or capacity) of one sensor is fully used to look at a first selected area, a second sensor can be used to look at a second area or to provide a higher update rate in part or all of the first selected area.

According to a second aspect of the present invention there is provided an imaging system comprising an image-data collection station which is rotatable about an azimuthal axis, the image data collection station comprising at least two circumferentially spaced image sensors arranged for rotation with the station, wherein at least one of the image sensors has a variable field of view and/or comprises means for varying the angle of elevation of the sensor.

Embodiments of the second aspect of the present invention enable the sensors to follow the same or different elevational paths around the azimuthal axis. This may be achieved by providing means for varying the elevation angle of a sensor. Where the paths followed by two image sensors are the same and the sensors have the same field of view, the data from the two sensors can be combined to provide enhanced image resolution over an entire captured image. Where the elevational paths followed by the two sensors differ, the image data provided by the sensors may be displayed on separate displays or may be combined to provide a wider overall field of view on a single display.

In one embodiment, at least one of the sensors comprises a zoom lens which can be zoomed-in on an area of particular interest. The resulting image data can either be displayed independently of image data captured by other sensors or can be used to selectively enhance the resolution of a region of an image captured by another image sensor having a wider field of view.

Preferably, the imaging system comprises an image monitoring station having control means for independently controlling the magnification of image sensor zoom lenses and/or the elevational angle of the image sensors. The control means comprises a tracking computer for identifying a target within an image and for direction one or more of the image sensors to track the identified target by dynamically controlling the elevation angle and/or zoom of the sensors. The control means is arranged to combine image data received from the or each tracking image sensor and from a further image sensor having a wider field of view which contains the target, whereby an image can be obtained in which the target is shown with an increased resolution relative to the remainder of a larger field of view image.

Preferably, the image sensors are spaced at regular angular intervals around the image data collection station.

Preferably, the image data collection station comprises at least four image sensors.

it will be appreciated that a particularly advantageous imaging system is achieved by combining both the first and second aspects of the present invention.

Figure 2:
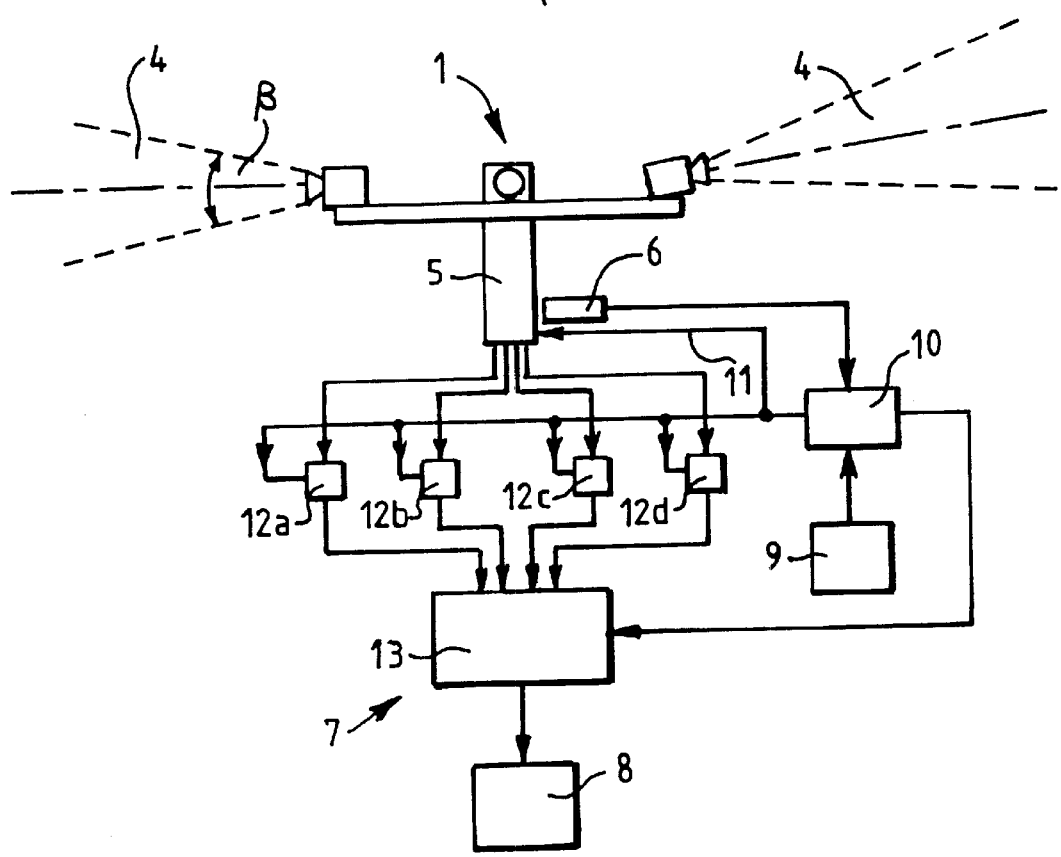

For a better understanding of the present invention and in order to show how the same may be carried into effect reference will now be made, by way of example, to the accompanying drawings, in which:

FIG. 1 shows in plan view data collection station embodying the present invention; and FIG. 2 shows a side view of the data collection station of FIG. 1 including an associated control system.

In the drawings, an imaging system comprises a data collection station 1 having a circular platform 2 on which are mounted four individual image sensors 3. The image sensors 3 are arranged around the periphery of the platform 2 is 2, spaced apart by 90°. The rotating platform nominally arranged to lie in a horizontal plane when in operation so that the platform rotates about a vertical, or azimuthal, axis. The system may be modified however to utilise a two-dimensional array of sensing elements, arranged along a plurality of vertical lines. Each line is scanned in turn, with the revolution rate of the platform 2 and the sensing element scan rate being synchronised to provide for contiguity of the image field over 360°.

FIGS. 1 and 2 illustrate the case where the images sensors 3 each have a field of view 4 which is substantially one-dimensional, extending over a maximum angle $\beta$ in a vertical plane. Each sensor 3 typically comprises a single column of vertically aligned image sensing elements (not shown in the Figures).

The following description of the operation of the imaging systems of FIGS. 1 and 2 assumes, in the first instance, that it is only required to obtain image data from two dimensionally opposed image sensors 3a, 3c and that both of these sensors are arranged to have the same field of view (i.e. $\beta$ is the same for both sensors) and the same elevational angle.

The sensor carrying platform 3 is rotated at a constant known rate by a drive mechanism 5 and accordingly the field view of view 4 of each sensor moves in a circular locus and traverses a 360° wide field. The absolute angular position of the platform at any instant is determined by an angular position sensor 6. A static image monitoring station 7 comprises a video display unit (VDU) a which is capable of displaying a portion of the visual field extending over an angle $\alpha_1$ of azimuthal extent and an angle $\beta_1$ in elevational extent (where $\beta_1$ is less than or equal to $\beta$). A manually-operable selector or 'pointer' 9 coupled to a sensor control computer 10 functions to designate an angle θ, relative to a datum direction 11 (see FIG. 1), which defines the centre of the field of extent $\alpha_1$, which the operator wishes to be displayed on the VDU 8. The sensor control computer 10 also combines parameters θ and $\alpha_1$ to determine the range of angular positions, namely from (θ−½$\alpha_1$) to (θ+½$\alpha_1$), over which image data must be collected from the selected image sensor(s) 3. In accordance with the calculated angular positions, the control computer 10 via line 11 turns the sensors 3 on and off for the appropriate periods of their rotation. It is noted that this arrangement eliminates unnecessary power consumption and electronic noise generation by turning sensors off when it is not required to obtain image data from those sensors.

When a sensor 3 is on, image data from that sensor 3 is passed to an associated gate device 12 which is also controlled by the control computer 10. The gate devices 12*b*, 12*d* associated with the two unselected sensors 3*b*,3*d* are maintained permanently off whilst those gates 12*a*,12*c* associated with the two selected sensors 3*a*,3*c* are toggled on and off substantially in synchrony with the selected sensors. More particularly, gate 12*a* is turned on for the period during which sensor 3*a* is within the selected azimuthal range and off for the period when sensor 3*a* is outside that range. Similarly, gate 12*c* is on when sensor 3*c* is within the selected range and off for the remainder of the platform revolution.

Image data passed by the gates 12*a*, 12*c* is checked alternately into an image framestore 13 so that the framestore is refreshed twice per platform revolution. Data is clocked out of the framestore 13 to refresh the VDU 8 at an appropriate rate. The framestore 13 may be of the type wherein the data is clocked-out to the VDU 8 at TV raster scan compatible rate irrespective of the data clocking-in rate which is determined by the characteristics of the image sensors 3 and the revolution rate of the platform 2 (a process known as 'scan conversion').

It will be apparent that the refresh rate of the VDU 8 is double that of the conventional system for the same rate of rotation. It will also be apparent that the refresh rate may be increased still further by turning on a further one or two image sensors 3. In the event that one of the sensors 3 is damaged so that it is unable to supply accurate image data to the image monitoring station 6, the system remains capable of supplying usable data to the VDU 8 because one or more sensors still remain operational. The system therefore provides for a considerable degree of redundancy with a graded performance degradation.

Consider now that one of the selected image sensors 3 is provided with a zoom lens which enables a narrow region of the surrounding scene to be viewed by that sensor with increased resolution. In addition, consider that sensor 3 is provided with a tilting mechanism to enable the elevation of the sensor 3 to be varied. Using the manually operable selector 9, an operator may select a particular area of the surrounding scene for display at a higher resolution. The system may comprise a second image monitoring station, with a second VDU, to allow the wide area field of view to be displayed at the same time as the selected view field of view. This arrangement would be useful for example in a situation where a target is present within the overall field of view and an operator requires to view the target in detail whilst also retaining a view of the surrounding area (e.g. to see if other targets enter the vicinity).

Typically, all four image sensors 3 are provided with independent zoom and tilt facilitate to maximise the flexibility of the system. It is therefore possible to assign for example two image sensors 3 to the target whilst assigning the remaining two sensors 3 to the wide area so that both may be displayed at a relatively high resolution.

As a target moves across the scene, it may be difficult for an operator to continue to manually track the target. The control computer 10 may therefore be used to automatically follow an operator-designated target across the scene by carrying out appropriate image processing operations. The control computer 10 can then be arranged to control the image sensor or sensors assigned to the target, varying the zoom and elevation as appropriate, to track the target. Provision may also be made for predicting the trajectory of the target when it leaves the field of view of one of the tracking sensors so that the following tracking sensor can be set to catch the target when it enters that sensors field of view.

The control computer 10 may also be arranged to switch on and off image sensors 3 as required in order to optimise the tracking accuracy and the bandwidth of image data. For example, in order to track a relatively slow moving target, only a single image sensor 3 may be required whilst in order to track a fast moving target all four image sensors may have to be used.

It will be appreciated that various modifications may be made to the above described embodiments without departing from the scope of the present invention. For example, the sensors 3 may be arranged at irregular angular spacings around the periphery of the circular platform 2. The number of sensors 3 may also differ, for example the data collection station may be provided with 2, 6, 8 or more sensors 3.

What is claimed is:

1. An imaging system comprising:
    an image-data collection station (1) which is rotatable about an azimuthal axis, the image-data collection station (1) comprising at least two circumferentially spaced-apart image sensors (3*a*, 3*b*, 3*c*, 3*d*) arranged for rotation with the station (1) so as to include a common field of view (4), each sensor comprising a single column of vertically aligned sensing elements, and
    a static image-monitoring station (7) comprising a video display unit (8) for displaying image data received from the collection station (1), and control means (9, 10, 11) for selectively and independently turning the sensors on and off during rotation of the data collection station (1),
    wherein image data from each image sensor (3*a*, 3*b*, 3*c*, 3*d*) is delivered to an image frame-store (13) via an associated gate device (12*a*, 12*b*, 12*c*, 12*d*) which is on/off controlled in synchrony with the sensors (3*a*, 3*b*, 3*c*, 3*d*) by said control means (9,10,11), and data from the image frame-store (13) is clocked out at a TV raster-scan compatible rate to the video display unit (8).

2. An imaging system as claimed in claim 1, wherein at least one of the image sensors (3*a*, 3*b*, 3*c*, 3*d*) has a variable field of view and/or comprises means for varying the angle of elevation of the sensor.

3. An imaging system as claimed in claim 2, wherein at least one of the sensors (3*a*, 3*b*, 3*c*, 3*d* ) comprises a zoom lens which can be zoomed-in on an area of particular interest.

4. An imaging system as claimed in claim 2 , wherein the control means (9, 10, 11) is arranged for independently controlling the magnification of image sensor zoom lenses and/or the elevational angle of the image sensors.

5. An imaging system as claimed in claim 4, wherein the control means (9, 10, 11) comprises a tracking computer for directing one or more of the image sensors (3a, 3b, 3c, 3d) to track a target within the image by dynamically controlling the elevation angle and/or zoom of the sensors.

6. An imaging system as claimed in claim 5, wherein the control means (9,10,11) is arranged to effect combination of image data received from the or each tracking image sensor and from a further image sensor having a wider filed of view which contains the target, whereby an image is obtained in which the target is shown with an increased resolution relative to the remainder of a larger field of view image.

* * * * *